(12) United States Patent
Egawa et al.

(10) Patent No.: US 7,636,515 B2
(45) Date of Patent: Dec. 22, 2009

(54) APPARATUS AND METHOD FOR TRANSCODING STILL IMAGE DATA FILES INTO MPEG VIDEO DATA FILES AND DIGITAL VIDEO PLAYER IMPLEMENTING SAME

(75) Inventors: Ren Egawa, Tredyffrin, PA (US); Michael Robert Harris, Phoenixville, PA (US)

(73) Assignee: STMicroelectronics, Inc., Carrollton, TX (US)

( * ) Notice: Subject to any disclaimer, the term of this patent is extended or adjusted under 35 U.S.C. 154(b) by 1804 days.

(21) Appl. No.: 10/034,751

(22) Filed: Dec. 27, 2001

(65) Prior Publication Data

US 2003/0123857 A1 Jul. 3, 2003

(51) Int. Cl.
*H04N 7/26* (2006.01)

(52) U.S. Cl. .............................. 386/111; 386/92; 386/96

(58) Field of Classification Search .................... 386/96, 386/92, 27, 121, 124; 348/581, 443
See application file for complete search history.

(56) References Cited

U.S. PATENT DOCUMENTS 6,151,074 A * 11/2000 Werner ..................... 348/425.1
6,728,317 B1 * 4/2004 Demos .................... 375/240.21

* cited by examiner

*Primary Examiner*—Marsha D Banks Harold
*Assistant Examiner*—Daniel Tekle
(74) *Attorney, Agent, or Firm*—Lisa K. Jorgenson; William A. Munck

(57) ABSTRACT

The CPU breaks a digital still image file down into multiple sub-picture files. Each sub-picture file is treated as an MPEG video frame and is used to construct an MPEG video stream. An MPEG processor then processes the MPEG video stream. The MPEG processor decodes the video stream and scales each sub-picture down to fit a monitor or television upon which the still image is to be displayed. Each scaled sub-picture is stored in a display buffer but is not displayed until the entire MPEG video stream is decoded.

18 Claims, 5 Drawing Sheets

APPARATUS AND METHOD FOR TRANSCODING STILL IMAGE DATA FILES INTO MPEG VIDEO DATA FILES AND DIGITAL VIDEO PLAYER IMPLEMENTING SAME

TECHNICAL FIELD OF THE INVENTION

The present invention is generally directed to digital image processing and, more specifically, to a digital video player such as a digital versatile disk (DVD) player that converts JPEG or other still image data files to MPEG data files for decoding by the player's MPEG decoder and display on a television screen as still images.

BACKGROUND OF THE INVENTION

Digital image products are typically able to perform multiple tasks. For example, digital versatile disk (DVD) players are not only able to play back DVDs but also music compact disks, video CDs, and MP3 audio. In order to remain competitive, digital video player manufacturers must continue to add new and innovative features to their players without increasing the price of the product. In some cases, the manufacturers must add these features while reducing the product price.

One of the more important new features is the ability to play back compressed digital still image files on a DVD player. These still images may have been created by digital cameras, photo scanners, or other digitizing means and then stored on a DVD, CD, or any other type of digital data storage media.

Most DVD players are comprised of two processing functions. One is the programmable central processing unit (CPU) that handles general control of the player. The second function is a hardwired engine that handles Moving Picture Expert Group (MPEG) decoding and displaying processes. As is well known in the art, MPEG is a video compression standard.

Still digital images are compressed using a different standard from MPEG. One example of such a compression standard is Joint Photographic Experts Group (JPEG). Typically, still digital image compression standards are not compatible with MPEG. Therefore, DVD CPUs/MPEG processors cannot support the display of digital still images.

One solution to this incompatibility is to add a still image processor (e.g., JPEG decoder) alongside the existing DVD MPEG processor. This approach, however, increases the cost of the DVD player.

Another solution is to shut off the DVD MPEG processor and load the CPU with still image decoding software codecs. This approach relies on the CPU alone to perform the still image decoding and display tasks. This approach is not commercially feasible due to the heavy task of image decoding performed by the CPU. The CPU takes a large amount of time to decode and display a still image. There is therefore a need in the art for an apparatus that economically displays both digital video and digital still images.

SUMMARY OF THE INVENTION

To address the above-discussed deficiencies of the prior art, it is a primary object of the present invention to use both a CPU and an MPEG processor to perform still image decoding and displaying.

The CPU breaks the image file down into multiple sub-picture files. Each sub-picture file is treated as an MPEG video frame and is used to construct an MPEG video stream. The MPEG video stream is then processed by the MPEG processor.

The MPEG processor decodes the video stream and scales each sub-picture down to fit a monitor or television upon which the still image is to be displayed. Each scaled sub-picture is stored in a display buffer but is not displayed until the entire MPEG video stream is decoded. The display is frozen until a new MPEG video stream is completely constructed and decoded.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise", as well as derivatives thereof, mean "inclusion without limitation"; the term "or", is inclusive, meaning "and/or"; the phrases "associated with" and "associated therewith", as well as derivatives thereof, may mean "include", "be included within", "interconnect with", "contain", "be contained within", "connect to or with", "couple to or with", "be communicable with", "cooperate with", "interleave", "juxtapose", "be proximate to", "be bound to or with", "have", "have a property of", or the like; and the term "controller" includes any device, system or part thereof that controls at least one operation, such a device may be implemented in hardware, firmware or software, or some combination of at least two of the same. In particular, a controller may comprise a data processor and an associated memory that stores instructions that may be executed by the data processor. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way so as to limit the scope of the invention. Those skilled in the art will understand that the principles of the present invention may be implemented in any suitably arranged digital video player.

The term "digital video player" refers to any type of digital video equipment that contains an MPEG video decoder. The term "digital video player" comprises digital versatile disk (DVD) players, digital video set top boxes, digital cable television set top boxes, digital satellite television set top boxes, compact disc players, and other types of digital data storage media. Although the present invention will be described with reference to a digital versatile disk (DVD) player, it is understood that the present invention is not limited to use in a digital versatile disk (DVD) player.

Figure 1:
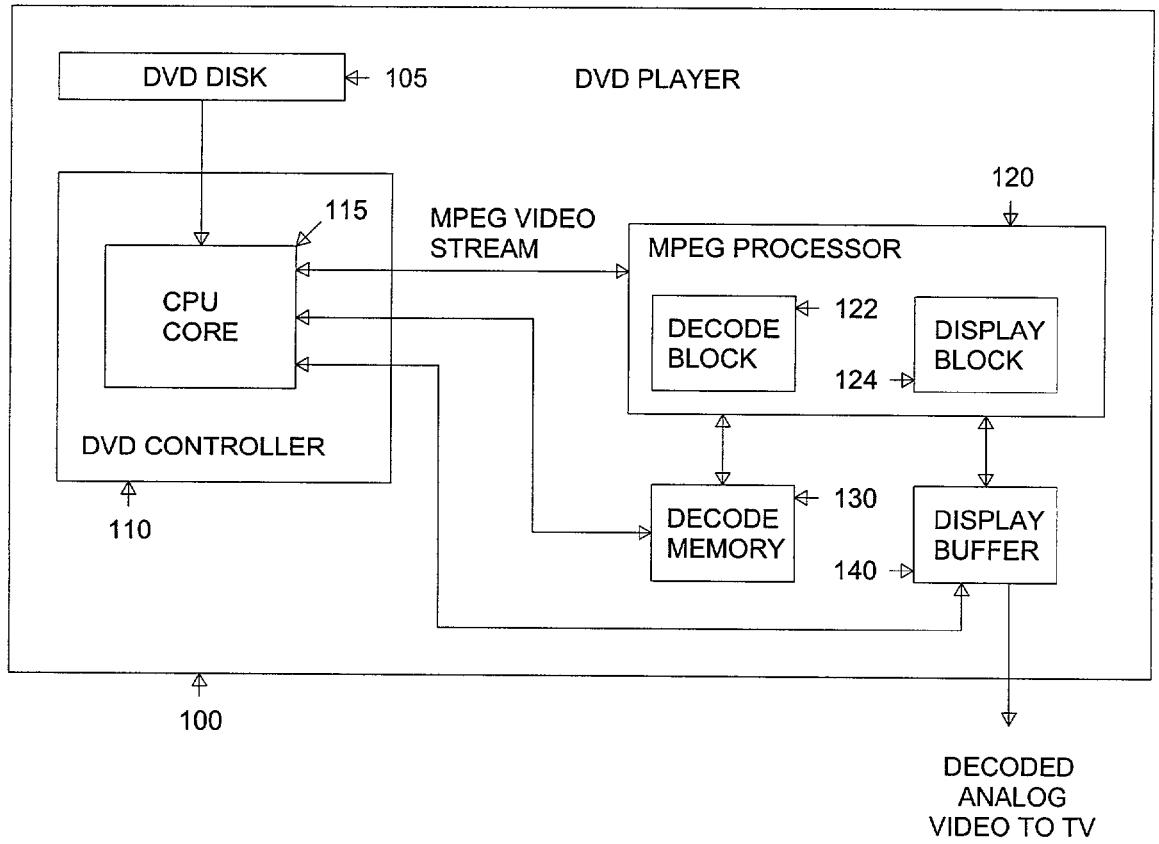
FIG. 1 illustrates a block diagram of a digital versatile disk player in accordance with one embodiment of the present invention.

FIG. 1 illustrates a block diagram of DVD player 100 of the present invention. DVD player 100 is comprised of DVD disk 105 that is encoded with a digital image in some compressed format such as JPEG.

The data stream from DVD disk 105 is fed into DVD controller 110. The controller is comprised of CPU core 115 that performs the control functions for DVD player 100.

MPEG processor 120 is coupled to DVD controller 110 over a bi-directional data connection. This data connection carries the MPEG video stream from CPU core 115 to MPEG processor 120.

MPEG processor 120 is further comprised of decode block 122 and display block 124. MPEG decode block 122 is responsible for decoding the MPEG video data into a decoded video stream. The decoded video stream is then stored in decode memory 130 for later use by DVD controller 110 and MPEG processor 120. Display block 124 is responsible for generating the analog video signal to be transmitted to the display (e.g., monitor, television). This signal is sent out from DVD player 100 through display buffer 140 that is controlled by DVD controller 110. Display buffer 140 is responsible for temporarily storing the decoded video until the television or monitor is ready to accept the signal.

Since a typical Standard Definition MPEG processor can only accept picture sizes up to 720×576 pixels (horizontal×vertical), the process of the present invention breaks down the larger still image file into smaller sub-picture blocks that are of a size that can be handled by the MPEG processor. The smaller digital image sub-picture files are then transcoded by the CPU into an MPEG video stream that is processed by the MPEG processor.

Figure 2:
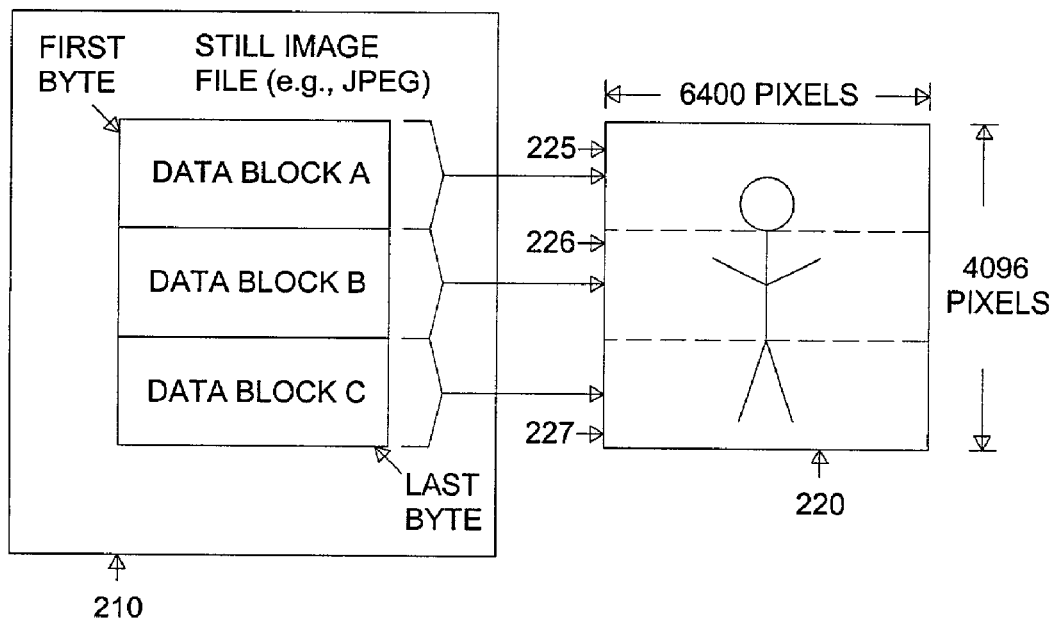
FIG. 2 illustrates a block diagram of a process for creating sub-pictures in accordance with one embodiment of the present invention.

FIG. 2 illustrates a block diagram of the generation of the sub-pictures in accordance with one embodiment of the present invention. Original still image file 210 is divided into multiple smaller sub-picture data blocks of a size that the MPEG processor can accept and decode them. In the embodiment of FIG. 2, data blocks A, B, and C are comprised of the data required to display the 6400×4096 pixel digital image 220.

In this embodiment, data block A corresponds to sub-picture 225, data block B corresponds to sub-picture 226, and data block C corresponds to sub-picture 227. Therefore, sub pictures 225-227 comprise substantially all of digital image 220.

Figure 3:
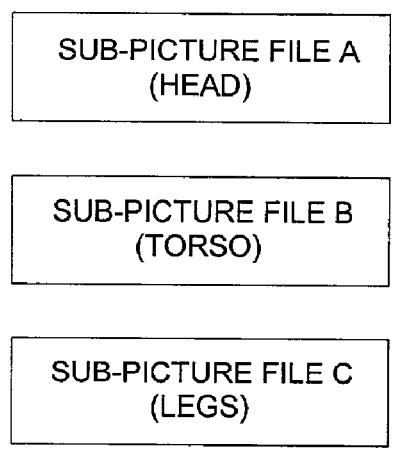
FIG. 3 illustrates a plurality of sub-pictures generated in accordance with the block diagram illustrated in FIG. 2.

FIG. 3 illustrates the files that comprise digital image 220. Sub-picture file A is a file of data that represents the head of image 220. Sub-picture file B is a file of data that represents the torso of image 220. Sub-picture file C is a file of data that represents the legs of digital image 220.

In order to determine the size of the sub-pictures of FIG. 3, it can be assumed that the sub-pictures are comprised of a collection of 16×16 Macro Blocks (MBs). A sub-picture can be considered to be a group of adjacent MB rows. The number of MB rows inside a sub-picture is determined as follows (assuming digital image 220 is used):

6400 horizontal image pixels/16 horizontal *MB* pixels=400 *MB*/row.

The number of rows of MBs is determined as follows (again assuming digital image 220 is used):

4096 vertical image pixels/16 vertical *MB* pixels=256 *MB* rows.

The process for determined the sub-picture size continues by choosing the highest number of MB rows whose total number of MBs is less than or equal to the maximum number of MBs that the typical Standard Definition MPEG processor can accept and decode. For example, assuming that the MPEG processor can handle only up to 720*480 pixels/16*16 pixels per MB=1350 MBs. From this example, the original image's MB row contains 400 MBs. Therefore, 3 MB rows would be the highest number and the total number of MBs would be 1200 MB. This is less than the typical Standard Definition MPEG processor's limit of 1350 MBs. This is illustrated as follows:

400 *MBs*/row*3 *MB* rows=1200 *MBs*<1350 *MBs*.

Therefore, for the cited example, sub-picture files A, B, and C each contain 3 MB rows. This is the equivalent of 1200 MBs.

The process then confirms that the total number of coded bits in the sub-picture does not exceed a video buffer size or any bit size that the MPEG processor cannot handle. If the number exceeds any maximum sizes, the number of MB rows is decreased until this criteria is met.

As an example, assume that the video buffer size is 1.8 M bits. This is also a maximum number of bits that a typical DVD MPEG process can handle for decoding an MPEG video frame in one embodiment of the present invention. If the original image's 3 MB rows (1200 MBs) would contain more than 1.8 M bits of coded bits, then 2 MB rows might be chosen for the sub-picture.

The above example is for illustration purposes only. The present invention is not limited to any one size or composition of digital image.

The CPU next transcodes the MPEG sub-pictures to convert them from a still image format to an MPEG format. These transcoded sub-picture files are then placed in an MPEG video stream file for processing by the MPEG processor.

Figure 4:
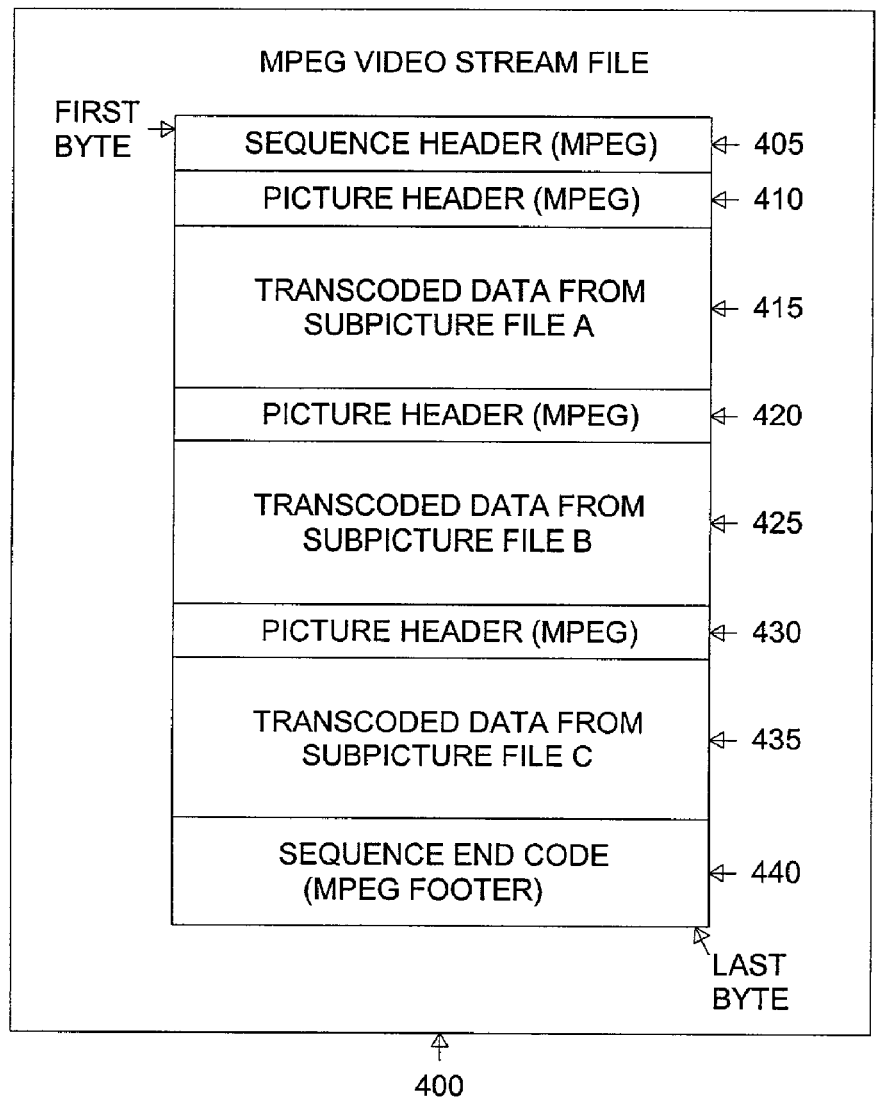
FIG. 4 illustrates an MPEG video stream file format in accordance with one embodiment of the present invention.

FIG. 4 illustrates a diagram of one embodiment of an MPEG video stream file of the present invention. MPEG video stream file 400 is comprised of sequence header 405. This header starts the video stream and informs the MPEG processor what to expect.

MPEG video stream file 400 is further comprised of transcoded data from sub-picture files A-C. These files are illustrated as transcoded sub-picture file A 415, sub-picture file B 425, and sub-picture file C 435. Each sub-picture file is preceded by picture header 410, 420, and 430 respectively. These picture headers are required by the MPEG standard.

MPEG video stream file 400 ends with sequence end code 440. This code is also referred to in the art as the MPEG footer.

Figure 5:
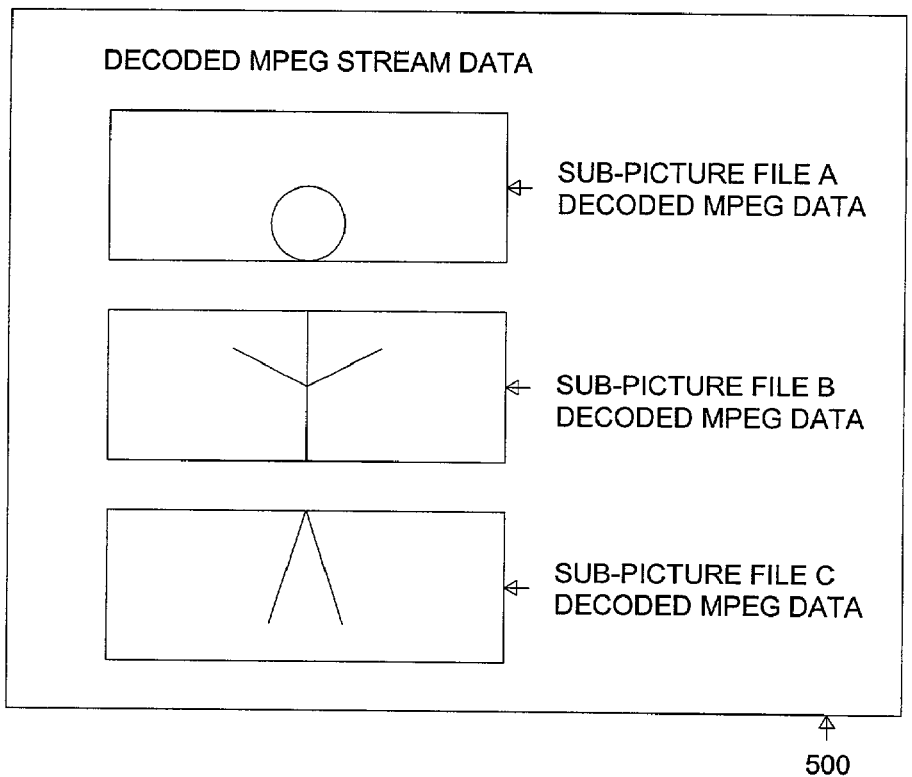
FIG. 5 illustrates a decoded MPEG video data stream in accordance with one embodiment of the present invention.

FIG. 5 illustrates decoded MPEG data stream 500. This data stream is comprised of each of the sub-picture files and is the resulting data stream from the MPEG processor processing MPEG video stream file 400.

Decoded MPEG stream data 500 is comprised of sub-picture file A decoded MPEG data, sub-picture file B decoded MPEG data, and sub-picture file C decoded MPEG data. Together these sub-picture files make-up digital image 220.

The sub-picture files should now be scaled down to a smaller image in order to be displayed on a monitor or television. This scaling, in the preferred embodiment, is performed through low-pass filtering and sub-sampling. This technique accesses neighboring pixels that adjacent to an MB. The overlapping MB row is utilized to allow the scaling process to access the pixels above or below an MB row that is currently being processed.

As an illustration of this scaling process, the 3 MB row example from above is assumed. The first sub-picture contains MB rows 0, 1, and 2. The second sub-picture contains MB rows 2, 3, and 4. The third sub-picture contains MB rows 4, 5, and 6. This continues to the last sub-picture that contains MB rows 253, 254, and 255. With this overlapping method, there are a total of 128 sub-pictures or MPEG video frames in the MPEG video stream.

This process for scaling is for illustration purposes only. The present invention is not limited to any one scaling process.

Since a typical Standard Definition MPEG processor may reject any frame size exceeding the 720*576 pixel limit, the MPEG processor may need to be forced to accept the scaled sub-picture data. If it is assumed that the sub-picture size is X (horizontal) by Y (vertical) pixels and the maximum picture size that the MPEG processor can accept is size W by H, this process derives new values X' and Y' as follows:

If X>W, then find integer k such that X/k<W and Y*k<H
Thus, X'=X/k and Y'=Y*k
If Y>H, then find integer 1 such that Y/1<H and X*k<W
Thus, X'=X*1 and Y'=Y/1.

The value of (X'*Y') is the total number of pixels of the sub-picture and matches the original value of (X*Y). The new values, X' and Y', are then used as the horizontal and vertical sizes in the MPEG video stream's sequence level headers.

Using the above 3 MB row sub-picture example as an illustration of this process, X=6400, Y=48, and the limit pair is W=720 and H=576. Since X>W, k is chosen as 10, thus:

$$X'=X/k=640<W$$

$$Y'=Y*k=480<H.$$

Therefore, 640×480 is encoded in the sequence-level headers when MPEG video stream 400 is constructed. The use of the 3 MB row sub-picture as an example in no way limits the present invention to this embodiment.

This down-scaling may be based on different ratios. One might be the size between the original still image and the display device. Another ratio might be the pel aspect ratio between the original still image and the display device.

To illustrate this concept, the 6400×4096 example would be scaled down to 640×410 if it was going to be displayed on a 640×480 display. In this case, the scale-down ratio would be 10 in both directions.

For each decoded MPEG video frame that represents the original's 3 MB row sub-picture would be scaled down to a picture of 4 lines of pixels where each line contains 640 pixels. In other words, 3 MB row=>6400 pixels*(16 lines per MB*3 MBs). After scaling by 10, this results in 640 pixels*4.8 lines. Truncating would result in 640 pixels*4 lines. Since the next sub-picture's first MB row overlaps with the current sub-picture's last MB row, it is safe to keep only 4 lines after the scaling. If the next sub-picture's first line after the scaling overlaps with the previous sub-picture's last line after the scaling, then the redundant line can be dropped.

During the down-scaling operation, adjacent pixels should be located outside of the current MB being scaled processed. This is due to the fact that the actual decoded MPEG frame is of shape X*Y while the constructed MPEG stream's sequence headers indicate a X'*Y' shape.

Since the MPEG sequence headers are encoded with 640*480, the MPEG processor may think that the decoded picture has been scaled down to 64*48 pixels. The CPU may clear this confusion by sending appropriate instructions to a display processor of the DVD player so that the 640*4 pixels would be stored in the appropriate addresses inside the display buffer. In this way, when all of the MPEG frames are decoded, all of the down-scaled MPEG frames inside the display buffer would be presented together on a television or monitor. The only loss of resolution would result from the down-scaling.

Figure 6:
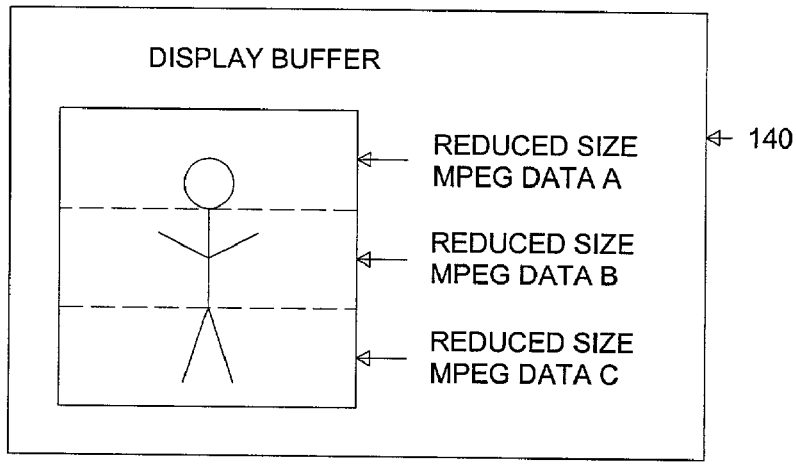
FIG. 6 illustrates a display buffer in accordance with one embodiment of the present invention.

FIG. 6 illustrates one embodiment of display buffer 140 using the above-described embodiment. Display buffer 140 is comprised of reduced size MPEG data A, reduced size MPEG data B, and reduced size MPEG data C. Display buffer 140 is the image that is displayed on the monitor or television after the processing of the present invention.

Each decoded frame in display buffer 140 has an associated display time stamp based on various MPEG rules that are well known in the art. To create an MPEG video stream that complies with the standard, an "artificial" display time stamp is created for a sub-picture so that all sub-pictures appear as if they formed an MPEG video sequence together. Since typical MPEG processors erase a decoded MPEG frame from the display buffer once its display time stamp has elapsed, the MPEG processor should be instructed to keep all down-scaled decoded MPEG frames in the display buffer until a new MPEG stream decoding is completed.

Figure 7:
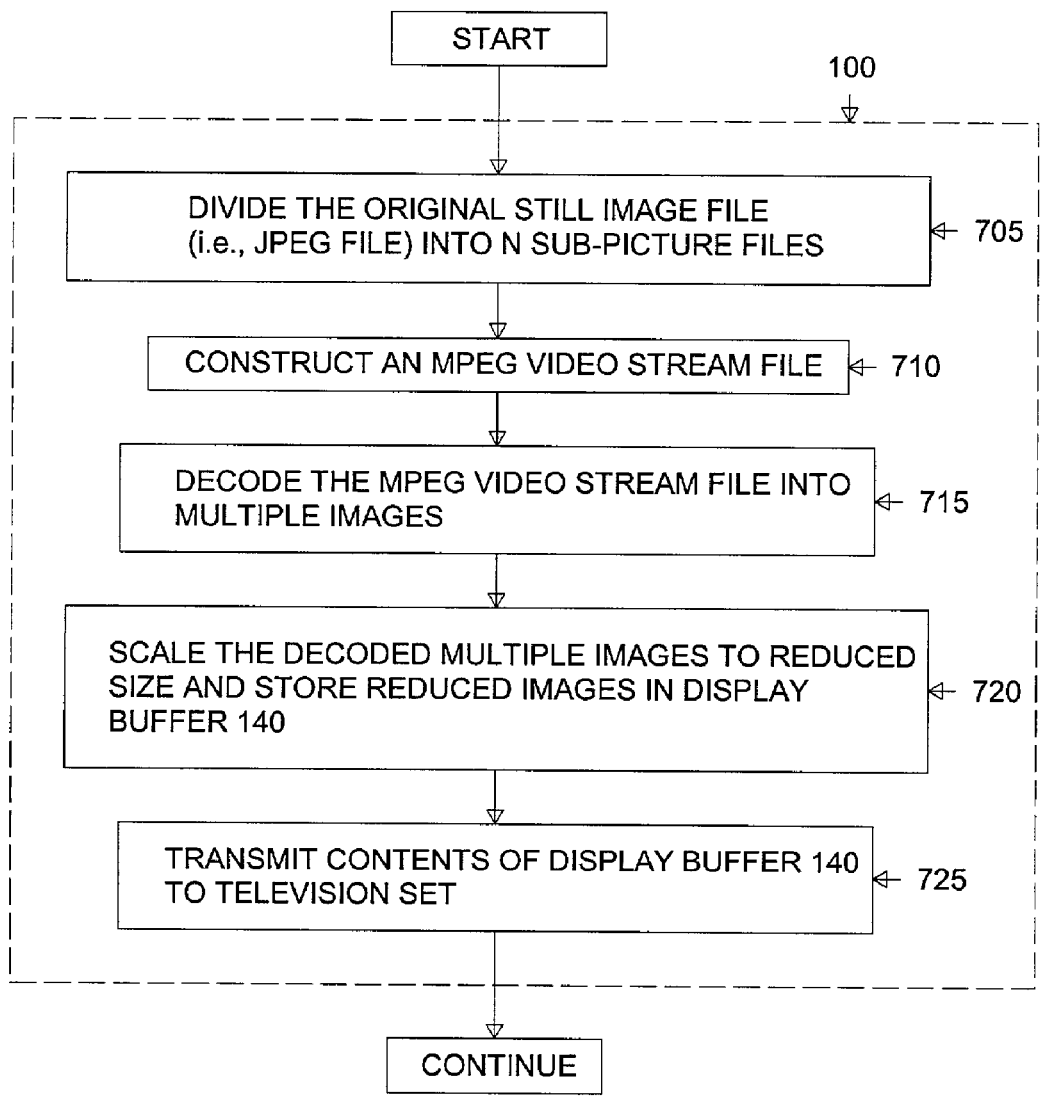
FIG. 7 illustrates a flowchart of one process of the present invention.

FIG. 7 illustrates a flowchart for one embodiment of a process for transcoding still image files to MPEG image files for display using a DVD player. Process 700 starts by dividing the original still image file (i.e., JPEG file) into N sub-picture files (step 705). As illustrated in the embodiment of FIG. 3, these sub-picture files are files A, B, and C.

These sub-picture files are then used to construct MPEG video stream file 400 (step 710). Video stream file 400 is decoded into multiple images (step 715). The decoded images are scaled to a reduced size and stored in display buffer 140 (step 720). The contents of display buffer 140 are then transmitted to the monitor or television (step 725).

Although the present invention has been described in detail, those skilled in the art should understand that they can make various changes, substitutions and alterations herein without departing from the spirit and scope of the invention in its broadest form.

What is claimed is:

1. For use in a digital video player, an apparatus for displaying a digital still image file using a Moving Picture Expert Group (MPEG) standard, the apparatus comprising:
   a controller capable of dividing the digital still image file into a plurality of sub-picture files, the controller further capable of constructing an MPEG video stream from the plurality of sub-picture files; and an MPEG processor capable of decoding the MPEG video stream to generate a plurality of decoded sub-pictures and scaling down the plurality of decoded sub-pictures to a plurality of reduced size decoded sub-pictures.

2. The apparatus as set forth in claim 1 wherein said MPEG processor is further capable of storing the plurality of reduced size decoded sub-pictures in a display buffer.

3. The apparatus as set forth in claim 2 wherein said MPEG processor is further capable of displaying contents of the display buffer only after the MPEG video stream is decoded.

4. The apparatus as set forth in claim 3 wherein said MPEG processor is further capable of freezing display of display buffer contents until a second MPEG video stream is completely decoded.

5. The apparatus as set forth in claim 1 and further including decode memory that stores the decoded sub-pictures.

6. The apparatus as set forth in claim 1 wherein said controller is further capable of determining a size for each of the plurality of sub-picture files.

7. The apparatus as set forth in claim 6 wherein said controller is capable of determining the size for each of the plurality of sub-picture files by calculating a quantity of 16×16 pixel macro blocks that is less than a maximum quantity of macro blocks that the MPEG processor can accept and decode.

8. The apparatus as set forth in claim 7 wherein said controller is further capable of determining that the size of each of the plurality of sub-picture files does not exceed a size of the display buffer.

9. The apparatus as set forth in claim 7 wherein each of said sub-picture files can be scaled down by overlapping a current sub-picture row of macro blocks with a last row of macro blocks from a subsequent sub-picture file.

10. A digital video player capable of displaying a digital still image from a digital data storage medium, said digital video player comprising:

a controller capable of dividing the digital still image file into a plurality of sub-picture files, the controller further capable of constructing an MPEG video stream from the plurality of sub-picture files; and an MPEG processor capable of decoding the MPEG video stream to generate a plurality of decoded sub-picture files and scaling down the plurality of decoded sub-picture files to a plurality of reduced size decoded sub-picture files.

11. The digital video player as set forth in claim 10 and further including memory for storing the plurality of decoded sub-picture files.

12. The digital video player as set forth in claim 10 wherein said MPEG processor is further capable of storing the plurality of reduced size decoded sub-pictures in a display buffer.

13. The digital video player as set forth in claim 12 wherein said MPEG processor is further capable of displaying contents of the display buffer only after the MPEG video stream is decoded.

14. The digital video player as set forth in claim 13 wherein said MIPEG processor is further capable of freezing display of display buffer contents until a second MPEG video stream is completely decoded.

15. The digital video player as set forth in claim 10 wherein said controller is further capable of determining a size for each of the plurality of sub-picture files.

16. The digital video player as set forth in claim 15 wherein said controller is capable of determining the size for each of the plurality of sub-picture files by calculating a quantity of 16×16 pixel macro blocks that is less than a maximum quantity of macro blocks that the MPEG processor can accept and decode.

17. The digital video player as set forth in claim 16 wherein said controller is further capable of determining that the size of each of the plurality of sub-picture files does not exceed a size of the display buffer.

18. The digital video player as set forth in claim 16 wherein each of said sub-picture files can be scaled down by overlapping a current sub-picture row of macro blocks with a last row of macro blocks from a subsequent sub-picture file.

* * * * *

UNITED STATES PATENT AND TRADEMARK OFFICE
CERTIFICATE OF CORRECTION

PATENT NO. : 7,636,515 B2  Page 1 of 1
APPLICATION NO. : 10/034751
DATED : December 22, 2009
INVENTOR(S) : Egawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2812 days.

Signed and Sealed this

Twenty-first Day of December, 2010

David J. Kappos
*Director of the United States Patent and Trademark Office*